(12) United States Patent
Christl

(10) Patent No.: US 11,333,121 B2
(45) Date of Patent: May 17, 2022

(54) METHOD FOR OPERATING A HYBRID MOTOR VEHICLE

(71) Applicant: Robert Bosch GmbH, Stuttgart (DE)

(72) Inventor: Werner Christl, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/584,116

(22) Filed: Sep. 26, 2019

(65) Prior Publication Data

US 2020/0102925 A1 Apr. 2, 2020

(30) Foreign Application Priority Data

Sep. 27, 2018 (DE) ...................... 10 2018 216 571.8

(51) Int. Cl.
| | |
|---|---|
| *B60W 20/16* | (2016.01) |
| *F02N 11/08* | (2006.01) |
| *F01N 9/00* | (2006.01) |
| *B60W 30/192* | (2012.01) |
| *F01N 3/20* | (2006.01) |

(52) U.S. Cl.
CPC ....... *F02N 11/0803* (2013.01); *B60W 30/192* (2013.01); *F01N 3/2006* (2013.01); *F01N 9/00* (2013.01); *F02N 2200/026* (2013.01)

(58) Field of Classification Search
CPC .............. F02N 2200/026; B60W 20/16; F01N 2900/1602; F01N 2900/1614
See application file for complete search history.

(56) References Cited

U.S. PATENT DOCUMENTS

| | | | | |
|---|---|---|---|---|
| 5,571,484 | A * | 11/1996 | Pettit ..................... | F01N 3/2033 422/173 |
| 5,785,138 | A * | 7/1998 | Yoshida ................ | B60W 10/06 180/65.245 |
| 8,726,661 | B2 * | 5/2014 | Spicer ................... | F01N 3/2889 60/618 |
| 2009/0025371 | A1 * | 1/2009 | Hermansson ............. | F01N 3/20 60/286 |
| 2010/0146938 | A1 * | 6/2010 | Baum ................... | B60W 20/15 60/285 |
| 2011/0283675 | A1 * | 11/2011 | Gonze ...................... | F01N 3/22 60/274 |
| 2014/0013726 | A1 | 1/2014 | Yacoub et al. | |
| 2014/0041368 | A1 * | 2/2014 | Stavrianos ............ | F02D 41/024 60/274 |

(Continued)

FOREIGN PATENT DOCUMENTS

| | | | | |
|---|---|---|---|---|
| DE | | 4230597 | C1 * 8/1993 | ........... F01N 3/2013 |
| DE | 102008063449 | | 7/2010 | |

(Continued)

*Primary Examiner* — Sherry L Estremsky
(74) *Attorney, Agent, or Firm* — Michael Best & Friedrich LLP

(57) ABSTRACT

A method for operating a hybrid motor vehicle. In one example, the vehicle comprises an internal combustion engine (10) and at least one electric motor (20). As long as at least one parameter of an exhaust gas aftertreatment system (12) of the internal combustion engine (10) lies outside a given range, the starting of the internal combustion engine (10) is delayed and the internal combustion engine (10) is dragged by the electric motor (20). At the same time at least one measure is carried out which changes the parameter.

12 Claims, 2 Drawing Sheets

(56) References Cited

U.S. PATENT DOCUMENTS

2014/0190147 A1* 7/2014 Roos .................... B60W 20/16
    60/274
2016/0251012 A1* 9/2016 Schneider .......... F02D 41/0235
    701/22

FOREIGN PATENT DOCUMENTS

| DE | 102016201597 A1 * | 8/2017 | .......... F01N 3/0878 |
|----|----|----|----|
| DE | 102016207667 | 11/2017 | |
| DE | 102019008946 A1 * | 6/2021 | |
| DE | 102019008954 A1 * | 6/2021 | |
| DE | 102019008955 A1 * | 6/2021 | |
| EP | 0419743 A1 * | 4/1991 | ................ F02B 1/02 |
| JP | H05187228 A * | 7/1993 | |
| JP | 2010007532 | 1/2010 | |

\* cited by examiner

METHOD FOR OPERATING A HYBRID MOTOR VEHICLE

BACKGROUND OF THE INVENTION

The present invention relates to a method for operating a hybrid motor vehicle. Furthermore, the present invention relates to a computer program which carries out each step of the method, as well as a machine-readable storage medium which stores the computer program. Finally, the invention relates to an electronic controller which is designed to carry out the method.

It is known to arrange in the exhaust gas line of internal combustion engines, especially diesel engines, a nitrogen oxide storage catalyst (Nitrogen Storage Catalyst, NSC) and/or a catalyst for the selective catalytic reduction of nitrogen oxides (Selective Catalytic Reduction, SCR). The NSC catalyst stores nitrogen oxides by adsorption on its surface. When the maximum storage capacity has been reached, a regeneration of the NSC catalyst is performed. For this, fuel is dispensed into the exhaust gas line upstream from the NSC catalyst. The hydrocarbons of the fuel bring about a desorption of the nitrogen oxides and react with them to form water, nitrogen and carbon dioxide. An SCR catalyst reduces the nitrogen oxides contained in the exhaust gas in the presence of ammonia to form nitrogen. This is generated by injecting ammonia-cleaving reagents into the exhaust gas line. Generally an aqueous urea solution (HWL) is used for this, which is injected into the exhaust gas line upstream from the SCR catalyst with the aid of a dispensing device. This HWL is stored in a reducing agent tank. However, the SCR reaction usually requires a catalyst temperature of more than 200° C. for a high degree of efficiency.

The introduction of new exhaust gas laws with a further lowering of the emission limit values is leading to a focus on operating states in which the internal combustion engine and its exhaust gas aftertreatment system are not yet in the optimal operating state. Such operating states occur in particular during the starting of an internal combustion engine. In particular in the case of hybrid vehicles, which are capable of driving for long distances without the internal combustion engine, the starting of the internal combustion engine represents a frequent challenge, because many engine starts occur during the driving of a hybrid motor vehicle, between which periods of lengthy electrical driving occur such that a cooldown of the exhaust gas aftertreatment system may occur therein.

SUMMARY OF THE INVENTION

The method serves for operating a hybrid motor vehicle, which comprises an internal combustion engine and at least one electric motor. As long as at least one parameter of an exhaust gas aftertreatment system of the internal combustion engine lies outside a given range, the starting of the internal combustion engine is delayed and the internal combustion engine is dragged by the electric motor. At the same time at least one measure is carried out which changes the parameter.

This method is based on the awareness that the efficiency of an exhaust gas aftertreatment system can be enhanced by preparatory measures prior to the starting of the internal combustion engine. In this way, a sudden rise in emissions shortly after the starting of the internal combustion engine and thus a violation of the emission limit values is prevented. However, many of these preparatory measures require a gas flow through the exhaust gas line of the internal combustion engine. Normally, this occurs only if the internal combustion engine has already been started. In a hybrid motor vehicle, however, it is possible to drag the internal combustion engine by means of an electric motor. In this way, the pistons in the cylinders of the internal combustion engine are moved by means of the crankshaft thereof and at the same time the inlet valves and outlet valves of the cylinders are opened and closed by means of the camshaft. This pumps air from the intake pipe of the internal combustion engine into its exhaust gas line. This air stream can be used for preparatory measures to increase the efficiency of the exhaust gas aftertreatment system.

In the method, parameters of the exhaust gas aftertreatment system are monitored, which should in each case lie in a given range for its optimal operation. If it is found that one of these parameters lies outside its respective given range, a starting request for the internal combustion engine will not be carried out at first. Instead, preparatory measures will be taken to improve the efficiency of the exhaust gas aftertreatment system and the internal combustion engine will be dragged by means of the electric motor in order to generate a gas flow through its exhaust gas line, making these preparatory measures possible. At least one measure is performed for each parameter lying outside its given range, which changes the parameter such that it comes closer to the given range.

In one embodiment of the method, the parameter is a temperature of the exhaust gas aftertreatment system. Many catalysts of an exhaust gas aftertreatment system, such as an SCR catalyst, require a certain minimum temperature in order to carry out their catalytic reactions with a high degree of efficiency. If the temperature of the exhaust gas aftertreatment system lies outside its given range, the measure taken is preferably a heating of the exhaust gas aftertreatment system. This may be done in particular by activating an energy source in the exhaust gas aftertreatment system. The energy source may be, for example, a burner, an electric heater, or a heat exchanger. Yet a heating of the exhaust gas aftertreatment system is also possible by dispensing fuel into the exhaust gas aftertreatment system. If at least one catalyst in the exhaust gas aftertreatment system is designed to convert fuel in an exothermic reaction into harmless products which do not impair the emissions of the motor vehicle so much that the emission limit value is violated, the waste heat of this reaction can heat up the exhaust gas aftertreatment system. The dispensing of fuel into the exhaust gas line may be carried out for example by initiating a fuel injection in a cylinder of the dragged internal combustion engine without activating the ignition. The unburned fuel is then expelled into the exhaust gas line.

In another embodiment of the method, the parameter is a nitrogen oxide load of a nitrogen oxide storage catalyst of the exhaust gas aftertreatment system. If the nitrogen oxide storage catalyst was largely or entirely laden with nitrogen oxides upon shutting off the internal combustion engine, it can only store little or no more nitrogen oxides upon starting the internal combustion engine. If the nitrogen oxide load is too high, the measure taken is preferably a dispensing of fuel into an exhaust gas line of the internal combustion engine. The fuel reacts on the surface of the nitrogen oxide storage catalyst with the nitrogen oxides to form harmless products. The dispensing of fuel into the exhaust gas line may occur in the same manner as was described above for the fuel dispensing to raise the temperature.

In yet another embodiment of the method, the parameter is an ammonia load of an SCR catalyst of the exhaust gas aftertreatment system. SCR catalysts store ammonia on their surface, which then reacts with the nitrogen oxides carried along with the exhaust gas. If the ammonia load is too low, the nitrogen oxides penetrating into the SCR catalyst can only be converted to a slight degree. If too low an ammonia load is detected, the measure taken is preferably a dispensing of ammonia or an ammonia-cleaving reagent, such as HWL, into the exhaust gas line of the internal combustion engine. This dispensing can be carried out by means of a dispensing valve upstream from the SCR catalyst. The dispensing valve during the operation of the SCR catalyst normally dispenses ammonia or the ammonia-cleaving reagent constantly into the exhaust gas line in order to replace the ammonia consumed in the SCR catalyst.

The computer program is designed to carry out each step of the method, especially when it is carried out on a computing device or an electronic controller. It enables the implementation of various embodiments of the method on an electronic controller, without having to make structural changes to it. For this purpose, it is stored on the machine-readable storage medium.

By running the computer program on a conventional electronic controller, an electronic controller is obtained which is designed to operate a hybrid motor vehicle by means of the method.

BRIEF DESCRIPTION OF THE DRAWINGS

An exemplary embodiment of the invention is represented in the drawings and will be explained more closely in the following description.

DETAILED DESCRIPTION

Figure 1:
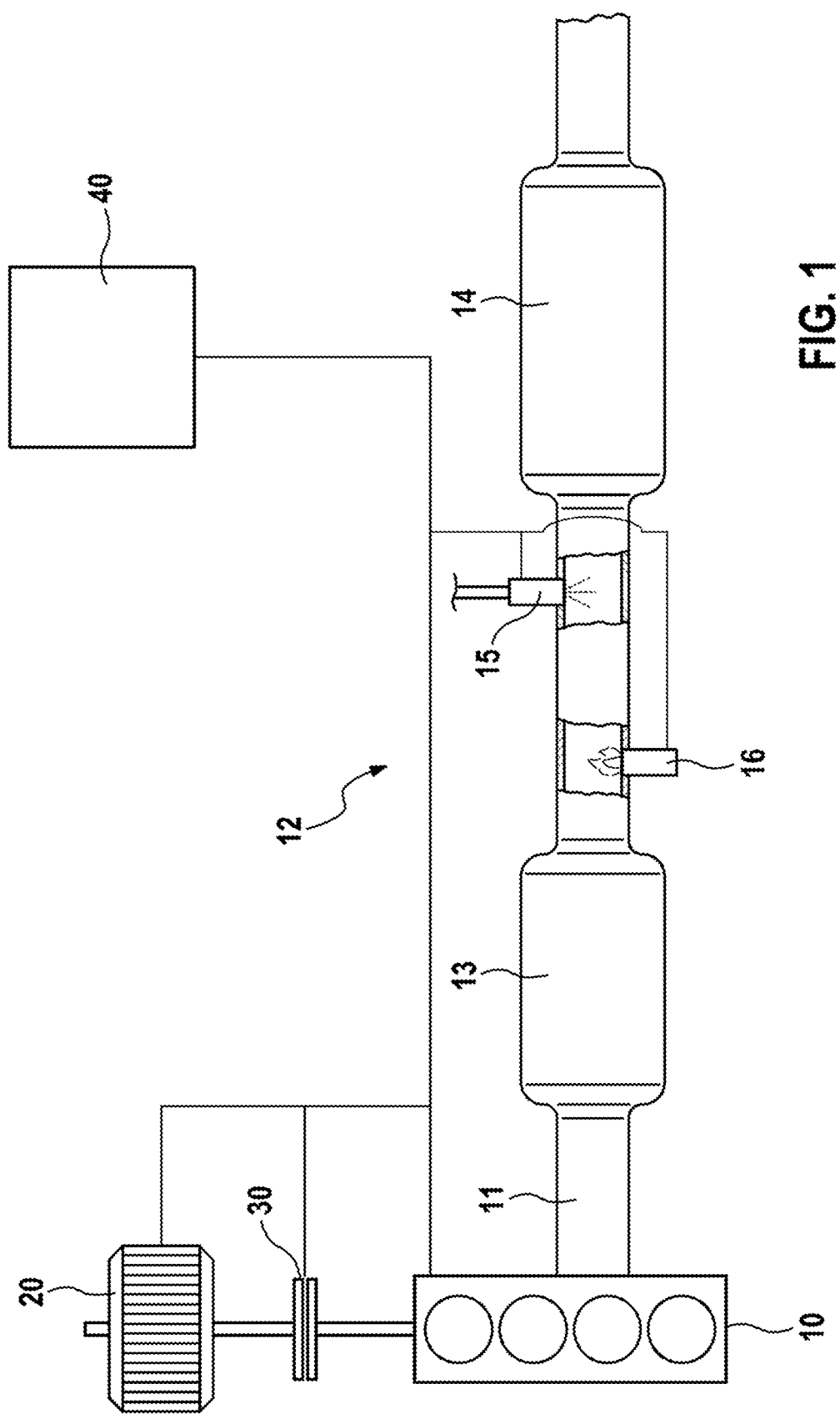
FIG. 1 shows schematically components of a hybrid motor vehicle, which can be operated by means of an exemplary embodiment of the method according to the invention.
Figure 2:
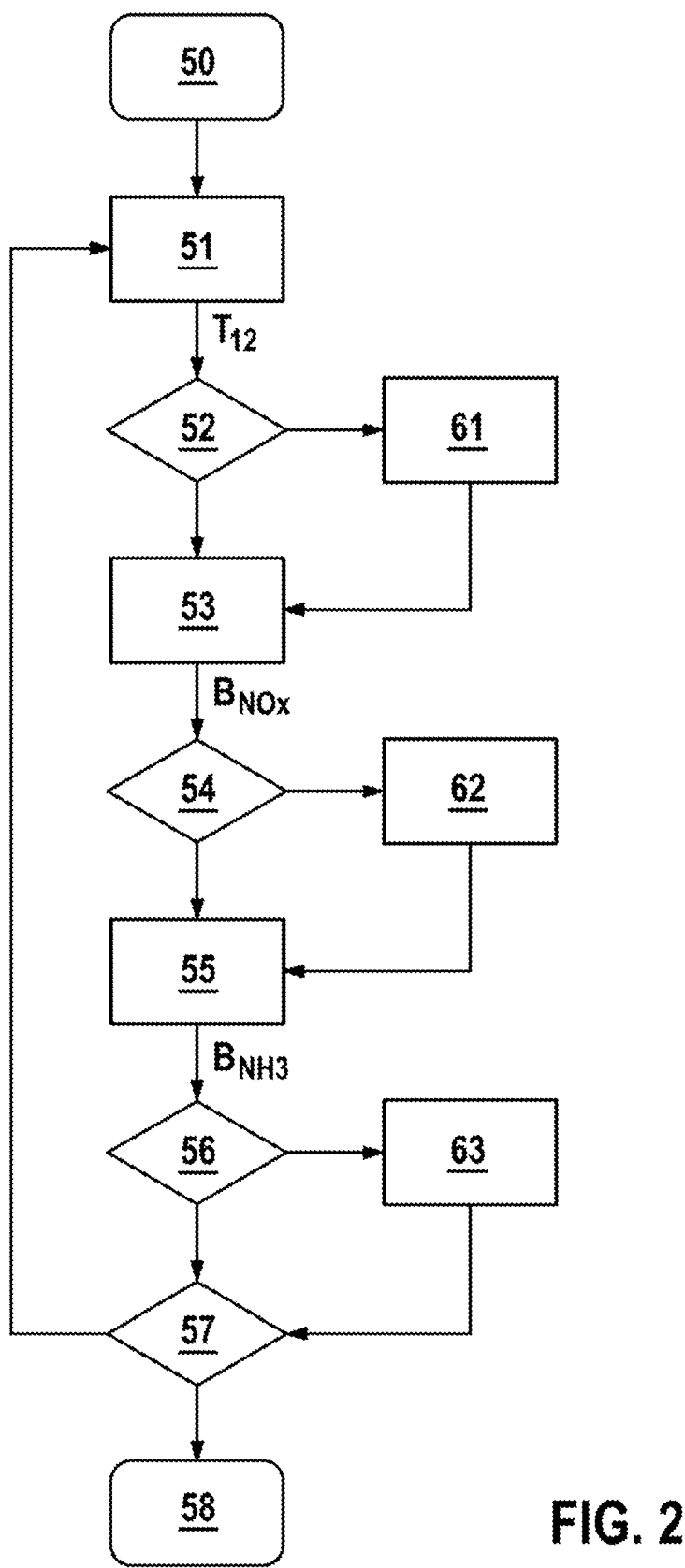
FIG. 2 shows a flow chart of an exemplary embodiment of the method according to the invention.

A hybrid motor vehicle comprises in one exemplary embodiment of the invention an internal combustion engine 10, which is designed as a diesel engine, and an electric motor 20. The two motors 10, 20 are arranged in series on a drive train and can be separated from each other by means of a coupling 30. The internal combustion engine 10 comprises an exhaust gas line 11 with an exhaust gas aftertreatment system 12. The exhaust gas aftertreatment system 12 comprises an NSC catalyst 13 and, downstream from the NSC catalyst 13, a SCR catalyst 14. The catalyst material of the SCR catalyst 14 is arranged on a diesel particulate filter (SCR on filter; SCRF). A dispensing valve 15 is arranged between the two catalysts 13, 14 in the exhaust gas line 11. It is designed to dispense HWL from a reducing agent tank, not shown, into the exhaust gas line 11. Between the NSC catalyst 13 and the dispensing valve 15 there is arranged a burner 16 in the exhaust gas line 11. When the burner 16 is turned on, it heats up the exhaust gas in the exhaust gas line 11 and thereby heats the SCR catalyst 14 situated downstream from the burner 16. Soot particles emitted by the burner 16 are bound in the diesel particulate filter of the SCR catalyst 14.

An electronic controller 40 controls the internal combustion engine 10, the electric motor 20 and the coupling 30. Moreover, it controls the dispensing valve 15 and the burner 16. By means of sensors, not represented, and models stored in the controller 40, it can ascertain the temperature $T_{12}$ of the exhaust gas aftertreatment system 12, the nitrogen oxide load $B_{NOx}$ of the NSC catalyst 13 and the ammonia load $B_{NH3}$ of the SCR catalyst 14.

An exemplary embodiment of the method according to the invention begins with a start request 50 arriving at the internal combustion engine 10. As a result of the start request 50, the coupling 30 is closed, in order to drag the internal combustion engine 10 by means of the electric motor 20. The fuel injection and ignition of the internal combustion engine 10 are for now not yet activated. In the controller 40, the current temperature $T_{12}$ of the exhaust gas aftertreatment system 12 is determined 51. If a following first check 52 reveals that the temperature $T_{12}$ lies below a temperature threshold value, a heating 61 of the exhaust gas aftertreatment system 12 will be started by activating the burner 16. Moreover, an entry will be generated in the controller 40 that the exhaust gas aftertreatment system 12 is not yet ready to operate. Regardless of the outcome of the first check 52, the current nitrogen oxide load $B_{NOx}$ of the NSC catalyst 13 is now determined 53. In a second check 54, it is checked whether this exceeds a nitrogen oxide load threshold value. If this is the case, a dispensing 62 of diesel fuel into the exhaust gas line 11 occurs, in that a fuel injection is initiated in the internal combustion engine 10 with the ignition switched off. This fuel may react on the surface of the NSC catalyst 13 with the nitrogen oxides stored there. Moreover, an entry will be generated in the controller 40 that the exhaust gas aftertreatment system 12 is not yet ready to operate. Regardless of the outcome of the second check 54, the ammonia load $B_{NH3}$ of the SCR catalyst 14 is determined 55. If a third check 56 reveals that this is below an ammonia load threshold value, a dispensing 63 of HWL into the exhaust gas line 11 will be carried out by initiating an injection by means of the dispensing valve 15. The HWL is decomposed in the exhaust gas line 11 to form ammonia, which is stored in the SCR catalyst 14. In this case as well, an entry is generated in the controller 40 that the exhaust gas aftertreatment system 12 is not yet ready to operate. Regardless of the outcome of the third check 56, a fourth check 57 will now be carried out. This will check whether an entry has been generated in the electronic controller 40 that the exhaust gas aftertreatment system 12 is not yet ready for dispensing. If no such entry is present, a starting 58 of the internal combustion engine 10 will occur. The coupling 30 can then be opened and the electric motor 20 switched off.

However, if such an entry is present, the entry will be reset and steps 51 to 57 will be performed once more. The measures 61, 62, 63 will be repeated as often as it takes until the first three checks 52, 54, 56 reveal that all parameters $T_{12}$, $B_{NOx}$, $B_{NH3}$ lie within their given ranges. The dragging of the internal combustion engine 10 by the electric motor 20 while waiting for the operational readiness of the exhaust gas aftertreatment system 12 will support the measures 61, 62, 63 by generating an air stream through the exhaust gas line 11. This transports the hot exhaust gases of the burner 16 and the HWL of the dispensing valve 15 to the SCR catalyst 14. Furthermore, it transports fuel injected into the internal combustion engine 10 to the NSC catalyst 13. In this way, a starting of the internal combustion engine 10 in an optimal operating range for the exhaust gas aftertreatment is made possible.

The invention claimed is:

1. A method for operating a hybrid motor vehicle that includes an internal combustion engine (10) and at least one electric motor (20), the method comprising:

as long as at least one parameter of an exhaust gas aftertreatment system (12) of the internal combustion engine (10) lies outside a given range, delaying starting of the internal combustion engine (10), dragging the internal combustion engine (10) by the electric motor (20);

determining a temperature ($T_{12}$) of the exhaust gas aftertreatment system as one parameter;

when the temperature ($T_{12}$) lies below a temperature threshold value, heating the exhaust gas aftertreatment system with a burner (16) arranged in an exhaust gas line (11) between a nitrogen storage (NSC) catalyst (13) and a selective catalytic reduction (SCR) catalyst (14);

determining a nitrogen oxide load ($B_{NOx}$) of the nitrogen oxide storage catalyst (13) of the exhaust gas aftertreatment system (12) as another parameter; and when the nitrogen oxide load ($B_{NOx}$) exceeds a nitrogen oxide load threshold value, dispensing fuel into an exhaust gas line of the internal combustion engine (10).

2. The method according to claim 1, including determining an ammonia load ($B_{NH3}$) of an SCR catalyst (14) of the exhaust gas aftertreatment system (12) as another parameter.

3. The method according to claim 2, when the ammonia load ($B_{NH3}$) is below an ammonia load threshold value, dispensing (63) ammonia or an ammonia-cleaving reagent into an exhaust gas line (11) of the internal combustion engine (10).

4. The method according to claim 3, including checking whether the exhaust gas aftertreatment system (12) is ready to operate, and starting the internal combustion engine when the temperature ($T_{12}$) lies at or above a temperature threshold value, the nitrogen oxide load ($B_{NOx}$) is at or below a nitrogen oxide load threshold value, and the ammonia load ($B_{NH3}$) is at or above an ammonia load threshold value.

5. A non-transitory computer-readable storage medium comprising instructions that when executed by a computer cause the computer to control a hybrid motor vehicle that includes an internal combustion engine (10) and at least one electric motor (20), by:

as long as at least one parameter of an exhaust gas aftertreatment system (12) of the internal combustion engine (10) lies outside a given range, delaying starting of the internal combustion engine (10), dragging the internal combustion engine (10) by the electric motor (20), and, at the same time, carrying out at least one measure which changes the parameter;

determining a temperature ($T_{12}$) of the exhaust gas aftertreatment system as one parameter;

when the temperature ($T_{12}$) lies below a temperature threshold value, controlling a heating of the exhaust gas aftertreatment system by a burner (16) arranged in an exhaust gas line (11) between a nitrogen storage (NSC) catalyst (13) and a selective catalytic reduction (SCR) catalyst (14);

determining a nitrogen oxide load (BNOx) of the nitrogen oxide storage catalyst (13) of the exhaust gas aftertreatment system (12) as another parameter; and when the nitrogen oxide load (BNOx) exceeds a nitrogen oxide load threshold value, controlling a dispensing of fuel into an exhaust gas line of the internal combustion engine (10).

6. The non-transitory computer-readable storage medium according to claim 5, wherein the instructions executed by the computer cause the computer to: determine an ammonia load ($B_{NH3}$) of an SCR catalyst (14) of the exhaust gas aftertreatment system (12) as another parameter.

7. The non-transitory computer-readable storage medium according to claim 6, wherein the instructions executed by the computer cause the computer to: when the ammonia load ($B_{NH3}$) is below an ammonia load threshold value, control dispensing (63) of ammonia or an ammonia-cleaving reagent into an exhaust gas line (11) of the internal combustion engine (10).

8. The non-transitory computer-readable storage medium according to claim 7, wherein the instructions executed by the computer cause the computer to check whether the exhaust gas aftertreatment system (12) is ready to operate, and start the internal combustion engine when the temperature ($T_{12}$) lies at or above a temperature threshold value, the nitrogen oxide load ($B_{NOx}$) is at or below a nitrogen oxide load threshold value, and the ammonia load ($B_{NH3}$) is at or above an ammonia load threshold value.

9. An electronic controller (40) for operating a hybrid motor vehicle that includes an internal combustion engine (10) and at least one electric motor (20), wherein the electronic controller is configured to:

as long as at least one parameter of an exhaust gas aftertreatment system (12) of the internal combustion engine (10) lies outside a given range, delay starting of the internal combustion engine (10), while dragging the internal combustion engine (10) by the electric motor (20);

determine a temperature ($T_{12}$) of the exhaust gas aftertreatment system as one parameter;

when the temperature ($T_{12}$) lies below a temperature threshold value, control heating of the exhaust gas aftertreatment system by a burner (16) arranged in an exhaust gas line (11) between a nitrogen storage (NSC) catalyst (13) and a selective catalytic reduction (SCR) catalyst (14);

determine a nitrogen oxide load ($B_{NOx}$) of the nitrogen oxide storage catalyst (13) of the exhaust gas aftertreatment system (12) as another parameter; and when the nitrogen oxide load ($B_{NOx}$) exceeds a nitrogen oxide load threshold value, control dispensing of fuel into an exhaust gas line of the internal combustion engine (10).

10. The electronic controller according to claim 9, wherein the electronic controller is configured to: determine an ammonia load ($B_{NH3}$) of an SCR catalyst (14) of the exhaust gas aftertreatment system (12) as another parameter.

11. The electronic controller according to claim 10, wherein the electronic controller is configured to: when the ammonia load ($B_{NH3}$) is below an ammonia load threshold value, control dispensing (63) of ammonia or an ammonia-cleaving reagent into an exhaust gas line (11) of the internal combustion engine (10).

12. The electronic controller according to claim 11, wherein the electronic controller is configured to: check whether the exhaust gas aftertreatment system (12) is ready to operate, and start the internal combustion engine when the temperature ($T_{12}$) lies at or above a temperature threshold value, the nitrogen oxide load ($B_{NOx}$) is at or below a nitrogen oxide load threshold value, and the ammonia load ($B_{NH3}$) is at or above an ammonia load threshold value.

* * * * *